US012679575B2

(12) United States Patent　　(10) Patent No.:　US 12,679,575 B2
Takahashi　　　　　　　　　　　(45) Date of Patent:　　　Jul. 14, 2026

(54) AERIAL VEHICLE

(71) Applicant: Kubota Corporation, Osaka (JP)

(72) Inventor: Yusuke Takahashi, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 19/223,767

(22) Filed: May 30, 2025

(65)　　　　　Prior Publication Data

US 2025/0289597 A1　　Sep. 18, 2025

Related U.S. Application Data

(63) Continuation of application No. PCT/JP2022/048151, filed on Dec. 27, 2022.

(51) Int. Cl.
　　*B64U 50/27*　　　(2023.01)
　　*B64U 10/16*　　　(2023.01)
　　*B64U 50/19*　　　(2023.01)
　　*B64U 60/50*　　　(2023.01)
　　*B64U 101/40*　　(2023.01)
(52) U.S. Cl.
　　CPC ............. *B64U 50/27* (2023.01); *B64U 10/16* (2023.01); *B64U 50/19* (2023.01); *B64U 60/50* (2023.01); *B64U 2101/40* (2023.01)
(58) Field of Classification Search
　　CPC ........ B64U 50/27; B64U 10/16; B64U 50/19; B64U 60/50; B64U 2101/40; B64U 2101/00; B64U 10/13; B64U 30/20; B64U 50/13; B64U 50/00; B64D 27/24
　　See application file for complete search history.

(56)　　　　　　References Cited

U.S. PATENT DOCUMENTS

| | | | | |
|---|---|---|---|---|
| 6,270,038 | B1 * | 8/2001 | Cycon .................... | B64U 30/14 244/12.3 |
| 12,006,033 | B1 * | 6/2024 | Villa ...................... | B64U 50/19 |
| 12,139,253 | B1 * | 11/2024 | Bernard ............... | B64C 13/503 |
| 12,428,985 | B2 * | 9/2025 | Ishikawa ............... | B64D 27/33 |
| 12,441,491 | B2 * | 10/2025 | Foster ................... | B64D 35/04 |
| 12,490,690 | B2 * | 12/2025 | Romar ................. | A01G 23/003 |
| 12,491,993 | B2 * | 12/2025 | German ................ | B64D 27/24 |
| 12,492,021 | B2 * | 12/2025 | Sartorius ............... | B64U 30/14 |
| 12,492,022 | B2 * | 12/2025 | Bry ........................ | B64U 60/50 |
| 2004/0211092 | A1 * | 10/2004 | Barnes ..................... | E02F 7/02 37/142.5 |
| 2010/0301168 | A1 * | 12/2010 | Raposo .................. | B64C 27/82 244/171.2 |

(Continued)

FOREIGN PATENT DOCUMENTS

| | | |
|---|---|---|
| CN | 104798528 A | 7/2015 |
| JP | 2018121594 A | 8/2018 |

(Continued)

OTHER PUBLICATIONS

International Search Report in PCT/JP2022/048151, mailed Mar. 7, 2023, 2 pages.

*Primary Examiner* — Medhat Badawi
(74) *Attorney, Agent, or Firm* — Keating & Bennett, LLP

(57)　　　　　　　ABSTRACT

An aerial vehicle connected to or integrated with a work device, including a power source to generate power, a rotor to generate lift used for flight by rotating a propeller, and a power transmission to transmit driving power to the work device.

6 Claims, 4 Drawing Sheets

(56)     References Cited

U.S. PATENT DOCUMENTS

| | | | | |
|---|---|---|---|---|
| 2011/0139923 | A1* | 6/2011 | Papanikolopoulos | B64U 10/80 244/2 |
| 2011/0301787 | A1* | 12/2011 | Chaperon | A63H 27/12 701/2 |
| 2012/0056041 | A1* | 3/2012 | Rhee | B64U 20/83 244/4 R |
| 2015/0184637 | A1* | 7/2015 | Vander Lind | B64U 10/60 290/44 |
| 2016/0325829 | A1* | 11/2016 | Ahn | B64U 10/14 |
| 2017/0029131 | A1* | 2/2017 | Steinwandel | B64U 10/25 |
| 2017/0253331 | A1* | 9/2017 | Nakashima | B64D 35/04 |
| 2018/0029703 | A1* | 2/2018 | Simon | B64U 30/24 |
| 2018/0030887 | A1* | 2/2018 | Zhao | F16H 7/02 |
| 2018/0035606 | A1* | 2/2018 | Burdoucci | A01D 34/008 |
| 2018/0244377 | A1* | 8/2018 | Chan | B64C 27/12 |
| 2019/0337613 | A1* | 11/2019 | Villa | B64C 23/00 |
| 2020/0342770 | A1* | 10/2020 | Shinya | G08G 5/34 |
| 2021/0016880 | A1* | 1/2021 | Ishikawa | F02B 61/04 |
| 2023/0042223 | A1* | 2/2023 | Ishikawa | B64U 50/11 |
| 2023/0054112 | A1* | 2/2023 | Rollins | B01F 35/21 |
| 2023/0322423 | A1* | 10/2023 | Kinoshita | G05D 1/622 701/3 |
| 2024/0336379 | A1* | 10/2024 | Ishikawa | B64U 50/20 |
| 2024/0343425 | A1* | 10/2024 | Ishikawa | B64U 10/16 |
| 2025/0033761 | A1* | 1/2025 | Ishikawa | B64U 30/24 |
| 2025/0287876 | A1* | 9/2025 | Sakaguchi | B64U 30/20 |
| 2025/0289597 | A1* | 9/2025 | Takahashi | B64U 50/13 |
| 2025/0289675 | A1* | 9/2025 | Masumoto | B65G 69/16 |
| 2025/0314198 | A1* | 10/2025 | Ishikawa | B64U 30/29 |
| 2025/0319998 | A1* | 10/2025 | Ishikawa | G01S 17/933 |
| 2025/0321598 | A1* | 10/2025 | Seino | B64U 50/11 |
| 2025/0322754 | A1* | 10/2025 | Sakaguchi | B64U 10/13 |
| 2025/0362683 | A1* | 11/2025 | Seino | B64U 50/19 |
| 2025/0362692 | A1* | 11/2025 | Masumoto | B64D 1/08 |
| 2025/0372964 | A1* | 12/2025 | Miron | B64U 10/60 |
| 2025/0374866 | A1* | 12/2025 | Hoover | A01G 3/088 |
| 2025/0376279 | A1* | 12/2025 | Tang | B64U 60/50 |

FOREIGN PATENT DOCUMENTS

| | | |
|---|---|---|
| JP | 2019059362 A | 4/2019 |
| JP | 2021167198 A | 10/2021 |

\* cited by examiner

AERIAL VEHICLE

CROSS REFERENCE TO RELATED APPLICATIONS

This application is a Continuation Application of PCT Application No. PCT/JP2022/048151 filed on Dec. 27, 2022. The entire contents of this application are hereby incorporated herein by reference.

BACKGROUND OF THE INVENTION

1. Field of the Invention

The present invention relates to aerial vehicles to which a work device can be provided to perform ground work.

2. Description of the Related Art

The aerial vehicle (autonomous flying device) disclosed in JP 2019-59362A includes a power source (engine) and a generator driven by the power source. This aerial vehicle flies with the use of power output from the power source or electric power output from the generator.

There is a demand for an aerial vehicle to which a work device that performs ground work can be installed, and that carries the work device while the ground work is being performed. In this case, it is conceivable that the driving power (power) to drive the work device is supplied from outside the aerial vehicle.

SUMMARY OF THE INVENTION

However, when the work device is driven by driving power supplied from outside the aerial vehicle, there is a possibility that the supply means such as a cable may interfere with flight and ground work.

Example embodiments of the present invention efficiently supply driving power to a work device.

An aerial vehicle according to an example embodiment of the present invention is an aerial vehicle connected to or integrated with a work device, including a power source to generate power, a rotor to generate lift used for flight by rotating a propeller, and a power transmission to transmit driving power to the work device.

With this configuration, the work device can be operated by the driving power transmitted from the power transmission of the aerial vehicle. This eliminates the need to receive driving power from outside the aerial vehicle. As a result, driving power can be efficiently supplied to the work device.

The power transmission may transmit the power generated by the power source as the driving power.

The power source supplies power to a portion or all of one or more rotors and other components. With the above configuration, the power generated by the power source included in the aerial vehicle can also be used as driving power to drive the work device. Therefore, there is no need to provide a separate power supply source to supply driving power to the work device, the configuration of the aerial vehicle can be simplified, and driving power can be efficiently supplied to the work device.

The power transmission may include a drive shaft of the power source, or an output shaft connected to the drive shaft.

With this configuration, the power generated by the power source can be easily transmitted to the work device as driving power.

The aerial vehicle may further include a generator to generate electric power with use of the power generated by the power source, wherein the power transmission may transmit the electric power generated by the generator as the driving power.

A portion or all of one or more rotors and other devices are operated by the electric power generated by the generator. With the above configuration, the electric power generated by the generator included in the aerial vehicle can also be used as driving power to drive the work device. This eliminates the need to provide a separate power supply source to supply driving power to the work device, the configuration of the aerial vehicle can be simplified, and driving power can be efficiently supplied to the work device.

The power transmission may transmit the electric power wirelessly.

With this configuration, wiring or the like to transmit electric power to the work device is not required and the configuration of the aerial vehicle can be simplified. As a result, driving power can be efficiently supplied to the work device.

The power transmission may transmit rotational power of the propeller as the driving power.

The rotor generates lift by rotating the propeller. With the above-described configuration, the rotational power that rotates the propeller can also be used as the driving power to drive the work device. This eliminates the need to provide a separate power supply source to supply driving power to the work device, the configuration of the aerial vehicle can be simplified, and driving power can be efficiently supplied to the work device.

The work device may be connected to an airframe of the aerial vehicle as a separate entity and operated by the driving power transmitted from the power transmission.

With this configuration, the aerial vehicle is integrally provided with the work device. This eliminates the need for a configuration to attach and detach the work device or a configuration for connecting a path to transmit driving power. As a result, the configuration of the aerial vehicle can be simplified and driving power can be efficiently supplied to the work device.

The work device may be detachable from the aerial vehicle.

With this configuration, an appropriate work device can be attached to the aerial vehicle depending on the work to be performed.

The power source may be an engine.

With this configuration, even in an aerial vehicle to which an engine is installed as a power source, driving power can be efficiently supplied to the work device.

The aerial vehicle may further include a work controller configured or programmed to adjust the lift generated by the rotor to control at least one of ground work altitude of the work device and a depth of ground work performed by the work device on a ground.

Since work is performed with use of the work device attached to the aerial vehicle, it is not easy to maintain an appropriate state for the ground work altitude, which is the distance between the work device and the ground, and the depth of the work performed by the work device on the ground. With the above configuration, the lift generated by the rotor allows work to be performed at an appropriate ground work altitude, and the altitude of the aerial vehicle can be adjusted so that work can be performed at an appropriate ground work depth.

The work controller may be configured or programmed to change a direction of the lift generated by the rotor to press the work device against the ground.

Ground work requires that the work device be pressed appropriately against the ground, but since the aerial vehicle is flying, it is not easy to press the work device sufficiently against the ground. With the above configuration, lift directed toward the ground is generated by the rotor, and this lift can be used to press the work device against the ground with high precision.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Figure 1:
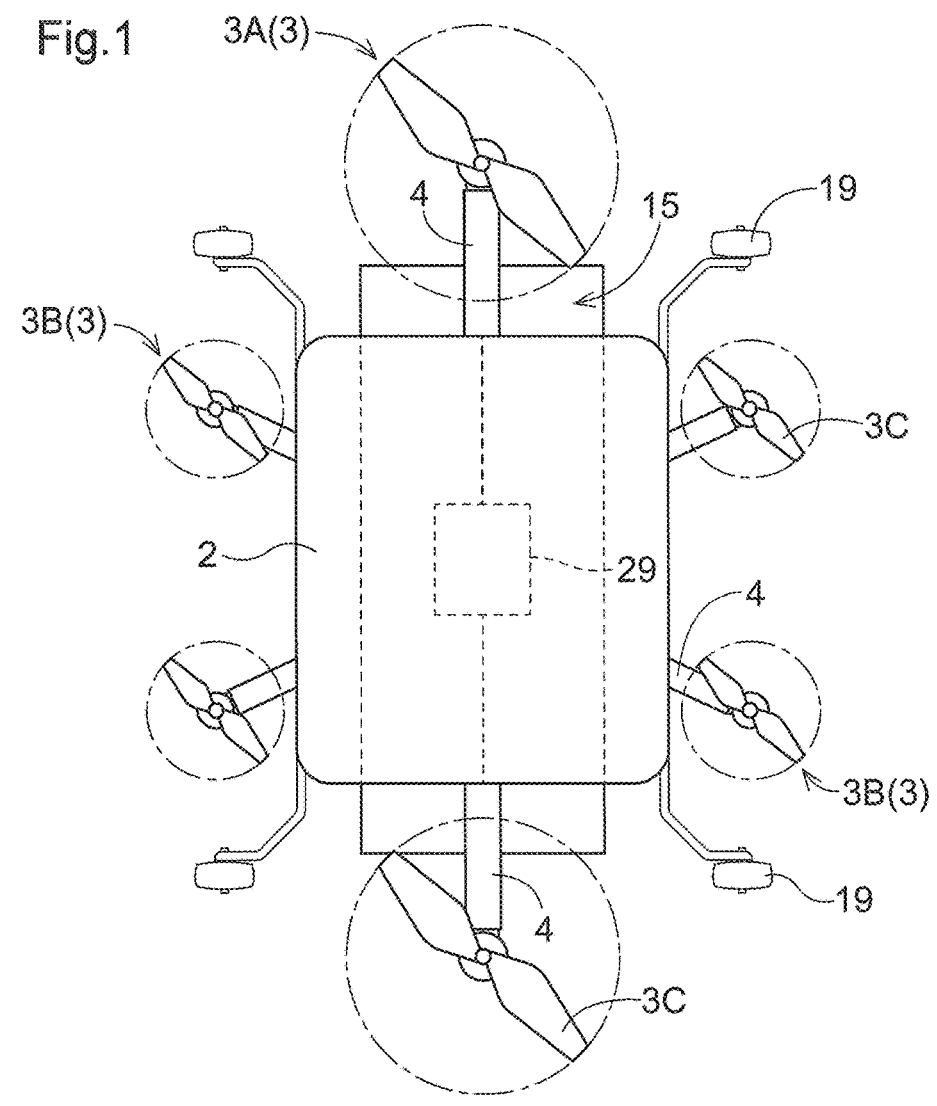
FIG. 1 is a plan view illustrating the configuration of an aerial vehicle.

Hereinafter, drones, which are examples of aerial vehicles according to the example embodiments to which work devices are provided, will be described with reference to the drawings. In the drawings, the direction indicated by U is upward, and the direction indicated by D is downward.

Figure 2:
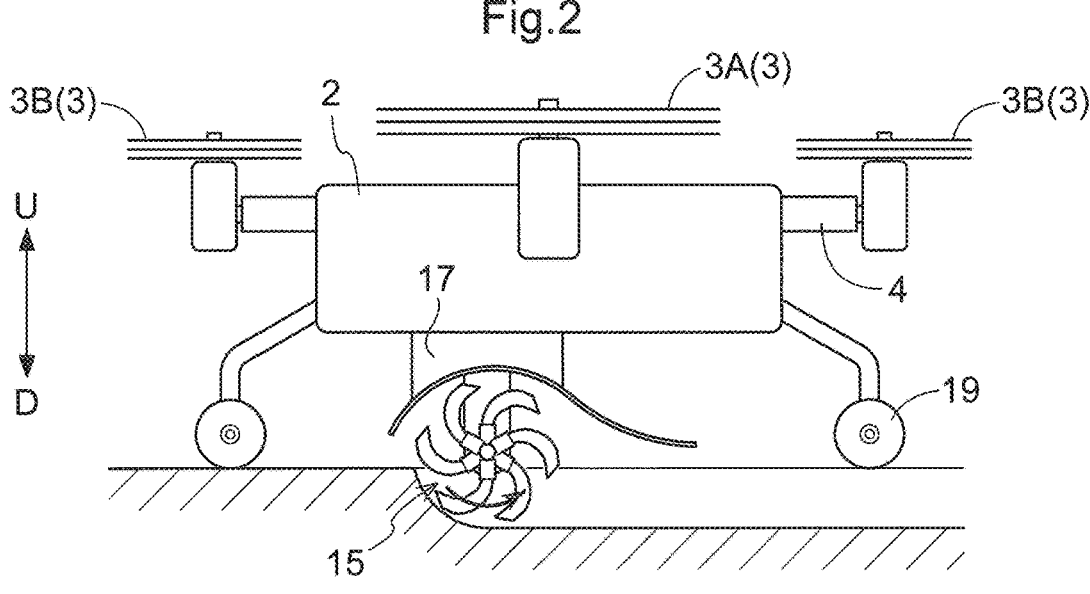
FIG. 2 is a diagram illustrating the configuration of the aerial vehicle and a work device during work.
Figure 3:
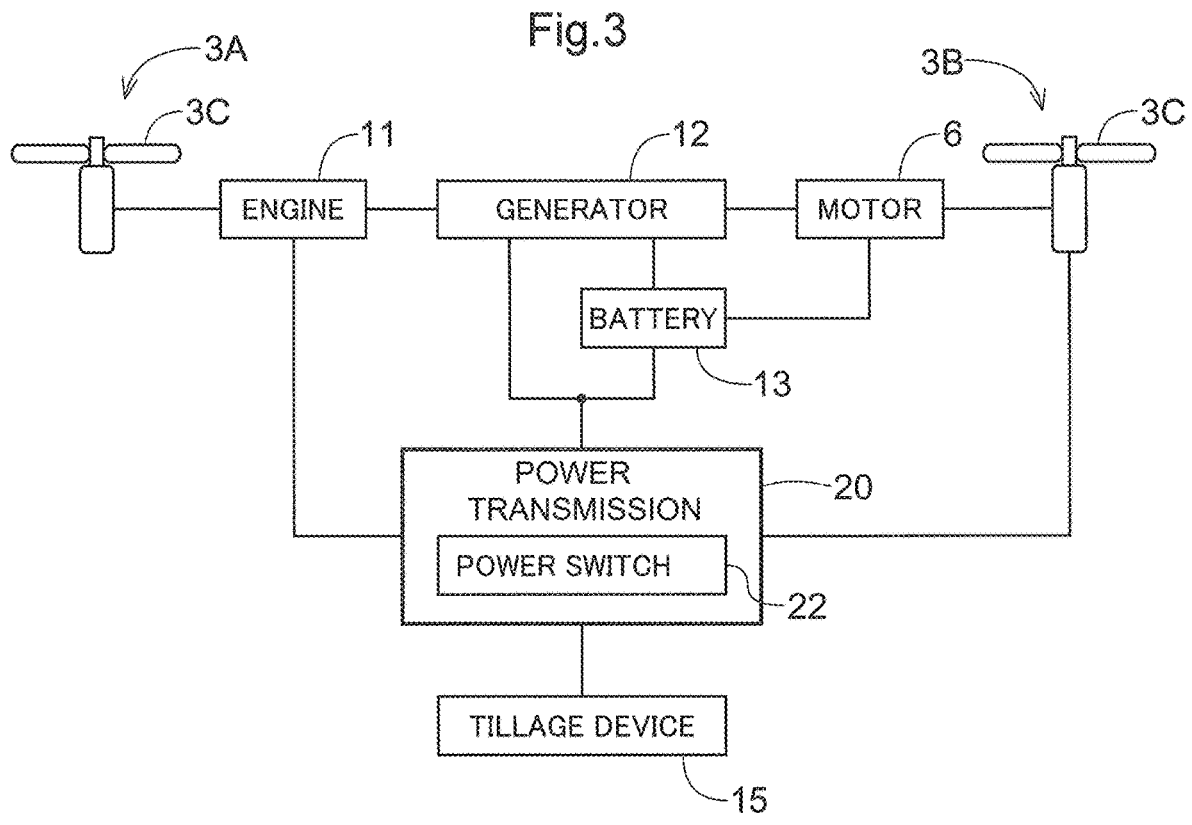
FIG. 3 is a diagram illustrating a driving configuration.

As shown in FIGS. 1 and 2, the drone includes a plurality of rotors 3, which are examples of a lift generator used for flight, and arms 4. The arms 4 protrude from a body 2 to the outside of the airframe. The rotors 3 are respectively supported by the arms 4. The rotors 3 are respectively provided with propellers 3C, and the rotation of the propellers 3C generates lift. The drone includes main rotors 3A (main lift generators) and sub-rotors 3B (secondary lift generators) as the rotors 3. The main rotors 3A generate lift used to propel the airframe of the drone (hovering, ascending, and descending) and enable the drone to fly, while the sub-rotors 3B are used to control the drone's attitude.

In the drone according to the present example embodiment, a work device is installed to the body 2 with a support 17 interposed therebetween. Any work device can be installed to the drone according to the present example embodiment, but in the following description, a drone to which a tillage device 15 is installed as a work device will be described as an example.

For example, the tillage device 15 is supported downward from the body 2 by the support 17 provided on the lower part of the body 2. The tillage device 15 operates with the use of power supplied from the airframe, for example the body 2.

The drone also includes wheels 19 supported by the body 2. The wheels 19 contact the ground when the tillage device

15 performs work on the ground, which is the work target, to support the drone on the ground and assist the tillage device 15 in working on the ground in a stable manner. The wheels 19 are supported on the body 2 by supports having a predetermined elasticity, and are supported so that the distance between the ground contacting parts of the wheels 19 and the lower end of the body 2 can be changed within a predetermined range.

Next, a configuration to drive the rotors 3 and the tillage device 15 will be described with reference to FIGS. 3 to 6 while also referring to FIGS. 1 and 2.

The body 2 includes an engine 11, a generator 12, and a battery 13, which are power sources. The generator 12 generates electric power with the use of the power output from the engine 11 and stores the generated electric power in the battery 13. The rotors 3 are operated by the power output from the engine 11, the electric power generated by the generator 12, or the electric power stored in the battery 13. For example, the main rotors 3A are operated by the power output from the engine 11, and the sub-rotors 3B are operated by the electric power generated by the generator 12 or the electric power stored in the battery 13. When the rotors 3 (the main rotors 3A) are operated by the power from the engine 11, the propellers 3C are rotated by the rotational power transmitted from the engine 11. When the rotors 3 (the sub-rotors 3B) are operated by electric power, the propellers 3C are driven to rotate by a motor 6 supplied with electric power. Note that the engine 11 may use, as fuel, fossil fuels such as gasoline and diesel (light oil), hydrogen, biofuel, and the like.

The body 2 includes a power transmission 20 that outputs driving power. The power transmission 20 transmits the power output from the engine 11, the electric power generated by the generator 12, or the electric power stored in the battery 13 to the tillage device 15 as driving power. The tillage device 15 is operated by the driving power transmitted from the power transmission 20.

Figure 4:
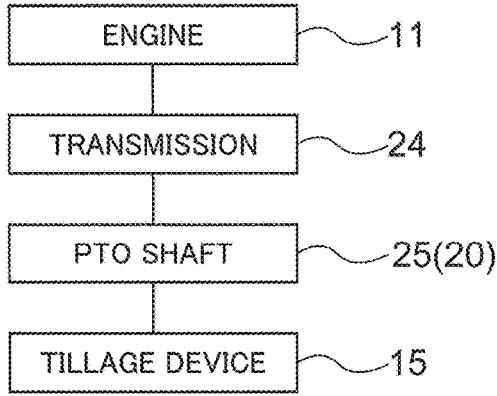
FIG. 4 is a diagram n illustrating a configuration to transmit driving power from an engine.
Figure 8:
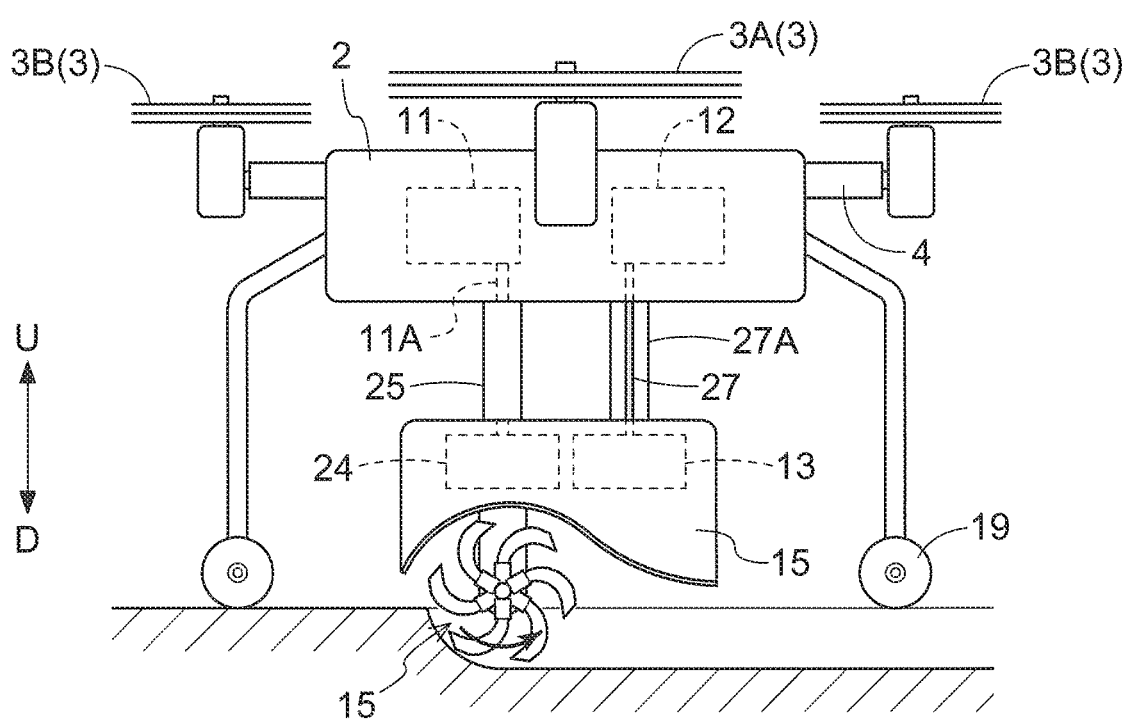
FIG. 8 is a diagram illustrating the arrangement of a transmission and a battery.

For example, as shown in FIGS. 4 and 8, the power from the engine 11 is transmitted from the power transmission 20 to the tillage device 15. Specifically, the rotational power output from the engine 11 is changed in a transmission 24 to a rotation speed required for the tillage device 15 and is transmitted to a PTO shaft (Power Take-Off shaft) 25, which is included in the power transmission 20. The PTO shaft 25, which is the output shaft for the driving power (rotational power), is connected to the input shaft of the tillage device 15, and the tillage device 15 is operated by the driving power input via the PTO shaft 25. The power (rotational power) generated by the engine 11 may be directly transmitted to the tillage device 15. In this case, a drive shaft 11A of the engine 11 may function as the power transmission 20, or the drive shaft 11A of the engine 11 may be connected to the PTO shaft 25. Also, the transmission 24 does not necessarily have to be provided in the body 2, but may be provided in the tillage device 15 and configured to shift the driving power (rotational power) input from the PTO shaft 25 or the drive shaft 11A of the engine 11.

Figure 5:
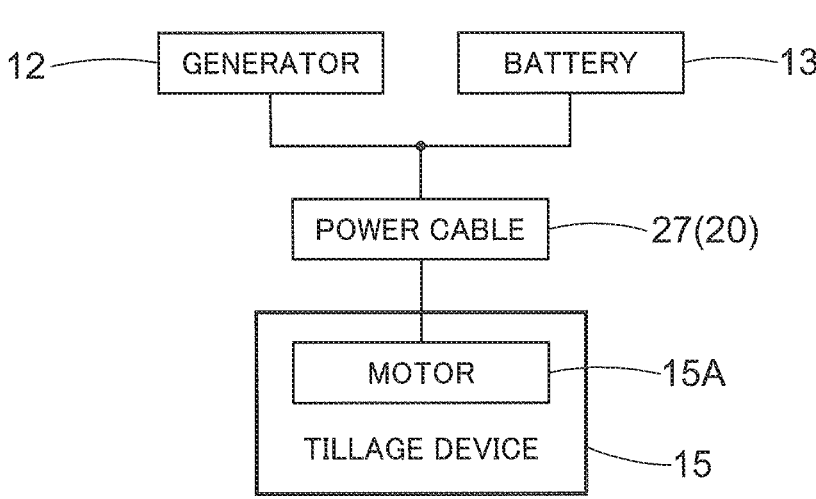
FIG. 5 is a diagram illustrating a configuration to transmit electric power.

Also, as shown in FIGS. 5 and 8, at least one type of power selected from the electric power generated by the generator 12 and the electric power stored in the battery 13 may be transmitted from the power transmission 20 to the tillage device 15.

Specifically, at least one type of power selected from the electric power generated by the generator 12 and the electric power stored in the battery 13 is transmitted (supplied) as driving power to the tillage device 15 via a power cable 27, which is included in the power transmission 20. In this case, the tillage device 15 includes a motor 15A, and the motor 15A is operated by the transmitted electric power. The tillage device 15 is operated by the power generated by the motor 15A. When electric power is transmitted to the tillage device 15 via the power cable 27, a non-rotating portion may be provided at the center or the like of the PTO shaft 25, and the power cable 27 may extend along that portion, or a shaft 27A along which the power cable 27 extends may be extended to the tillage device 15 separate from the PTO shaft 25.

Note that electric power may be transmitted to the tillage device 15 via the power cable 27 in a wired manner, but may also be transmitted wirelessly. In this case, the body 2 includes a wireless transmission (not shown) as the power transmission 20, and electric power is transmitted from the wireless transmission to a wireless receiver (not shown) included in the tillage device 15.

Figure 6:
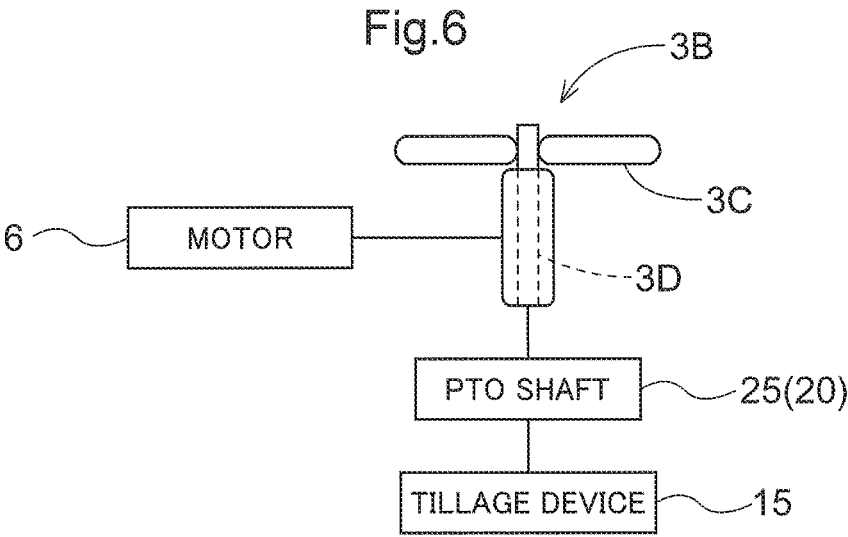
FIG. 6 is a diagram illustrating a configuration to transmit rotational power of a propeller.

As shown in FIG. 6, the rotational power of the propellers 3C of the rotors 3 may be transmitted from the power transmission 20 to the tillage device 15. Specifically, each propeller 3C is connected to a rotating shaft 3D, and rotates when the rotating shaft 3D is rotated by the motor 6. The PTO shaft 25, which is included in the power transmission 20, rotates by receiving the rotational power of the rotating shaft 3D. The tillage device 15 is operated by the rotational power (driving power) input via the PTO shaft 25. In this case as well, the transmission 24 may be provided in the body 2 or the tillage device 15, and a configuration may be adopted in which the driving power (rotational power) input from the PTO shaft 25 is shifted.

As described above, the tillage device 15 can be operated by the driving power transmitted from the power transmission 20 of the drone. This eliminates the need to receive driving power from the outside of the drone. As a result, driving power can be efficiently supplied to the tillage device 15.

In the above example embodiments, the power transmission 20 does not necessarily have to be configured to transmit all of the power output from the engine 11, electric power, and the rotational power that rotates the propellers 3C to the tillage device 15, and need only be configured to transmit at least one type of power selected from these types of power to the tillage device 15 as driving power. This allows driving power to be efficiently supplied to the tillage device 15 in a configuration suited to requirements.

Also, the power transmission 20 may be configured to selectively transmit one or more of the power output from the engine 11, electric power, and the rotational power that rotates the propellers 3C to the tillage device 15 as driving power. This makes it possible to efficiently supply desirable power to the tillage device 15 according to the work situation, work environment, and the condition of the tillage device 15 (work device).

Specifically, the power transmission 20 includes a power switch 22. In response to the control performed by the power switch 22, the power transmission 20 transmits one or more types of power selected from the power output from the engine 11, electric power, and the rotational power that rotates the propellers 3C to the tillage device 15 as driving power. The power switch 22 may determine and control the operating status of the engine 11, the power generation and storage status, the rotation status of the propellers 3C, etc., or may select the driving power according to the status and requirements of the tillage device 15 (work device).

In each of the above example embodiments, the work device is not limited to the tillage device 15, but may be another device that performs ground work, or a device that performs any work, such as spraying chemicals.

Figure 7:
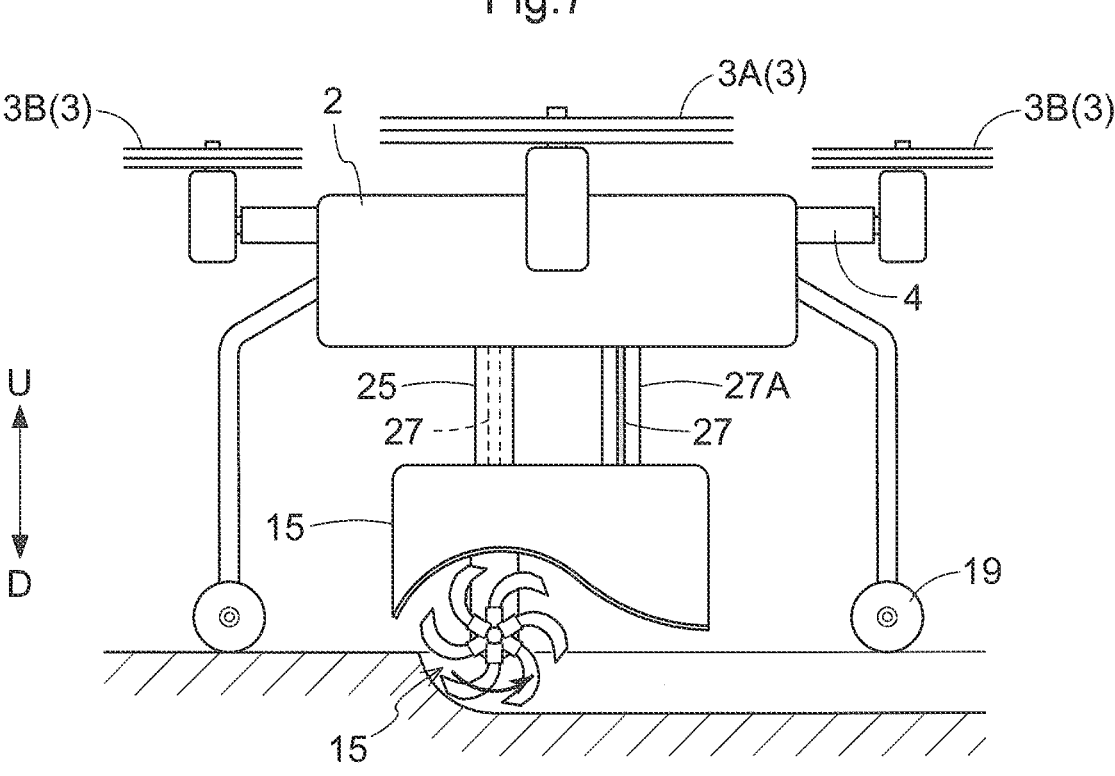
FIG. 7 is a diagram illustrating the configuration of a PTO shaft and a power cable 27.

In each of the above example embodiments, the tillage device 15 (work device) may be provided integrally with the drone, but may be attached (connected) to the drone as a separate entity in a detachable manner, as shown in FIG. 7. Also, the work device may be connected at a distance from the body 2 (airframe) of the drone. In this case, at least one of the PTO shaft 25 and the power cable 27 is provided in such a manner as to protrude from the airframe and is connected to the work device. The power transmission 20 also functions as an external terminal that outputs driving power to the tillage device 15 (work device) attached thereto. The drone also includes, as needed, a support mechanism for supporting the tillage device 15 (work device) to be attached or detached, and a holder or the like to maintain the connection between the power transmission 20 and the input terminal (input shaft or the like) of the tillage device 15 (work device).

In this way, since the work device is configured to be attachable to and detachable from the drone, the drone can perform various tasks depending on the work device attached thereto. As a result, the drone can perform various types of work while efficiently supplying driving power to the work device.

In each of the above example embodiments, at least one of the engine 11, the generator 12, the battery 13, and the power transmission 20 may be provided in any location of the drone, not limited to the body 2. In this case, driving power is supplied to the tillage device 15 (work device) from any location in the airframe of the drone. This enhances the flexibility of the drone's configuration.

Also, as described above, the transmission 24 does not necessarily have to be installed to the drone, but may be provided in the work device (the tillage device 15) as shown in FIG. 8. Also, the battery 13 does not necessarily have to be provided in the drone, and may be provided in the work device (the tillage device 15). The work device stores the electric power transmitted via the power cable 27 in the battery 13, and the motor 15A of the work device operates with the use of the transmitted electric power or the electric power stored in the battery 13.

In other words, heavy objects, such as the transmission 24, and the battery 13 for the work machine may be provided in the work device performing the ground work. In the present example embodiment, the drone only includes the engine 11 and the generator 12, which are energy generation sources, and the power generated by these sources can be converted in the work device or stored in the battery 13. As a result, the weight of the drone is reduced and the cruising range of the drone can be extended during normal work.

(5) In each of the above example embodiments, the drone does not necessarily have to include the battery 13. In this case, the electric power generated by the generator 12 is directly supplied to the rotors 3, the work device, or both.

In each of the above example embodiments, the arms 4 may not be provided, and the rotors 3 may be supported by the body 2.

In each of the above example embodiments, the drone may include a work controller 29 configured or programmed to adjust the magnitude of lift generated by the rotors 3 to control the height of the work device from the ground, i.e., the ground work altitude and the depth of the ground work performed by the work device on the ground.

When the work device performs ground work, the work device is maintained at a predetermined ground work altitude, and the work device performs ground work so that the ground work depth equals a predetermined depth. Therefore, it is necessary to maintain the drone's altitude at a predetermined altitude.

Increasing the lift generated by the rotors 3 during flight will cause the airframe to ascend, and decreasing the lift generated by the rotors 3 will cause the airframe to descend. Therefore, the drone can control the ground work altitude and ground work depth by adjusting the lift generated by the rotors 3 and adjusting the altitude of the airframe.

In each of the above example embodiments, the drone may include a work controller 29 configured or programmed to change the direction of lift generated by the rotors 3, and the lift may be used to press the work device against the ground.

In order for the work device to perform appropriate ground work, for example, to perform ground work at an appropriate depth, it may be necessary to press the work device against the ground. For example, the tillage device 15 is pressed against the ground with a predetermined force according to the hardness of the work land, etc., in order to till the work land at a predetermined tillage depth.

The rotors 3 generate upward lift for flight. Then, when the direction of the lift generated by the rotors 3 is changed to a downward direction (the direction of gravity), a downward force is generated on the airframe. The drone may be integrated with a work device, and in such a case, when it is necessary to press the work device against the ground, the drone can change the direction of the lift generated by the rotors 3 to press the work device against the ground. For example, the drone detects the tillage depth in real time and adjusts the force pressing the tillage device 15 against the ground by changing the direction of the lift generated by the rotors 3, so that tillage is performed at a predetermined tillage depth.

In order to change the direction of the lift generated by the rotors 3, each of the rotors 3 may be rotated about a horizontal axis and turned upside down, or the direction of rotation of the propellers 3C of the rotors 3 may be reversed.

In each of the above example embodiments, the work device is not limited to the tillage device 15 and may be any work device. For example, the work device may be a grass cutter, a transplanter, a harvester, a cleaning machine, or the like.

Example embodiments of the present invention are applicable to aerial vehicles to which various types of work devices can be provided.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An aerial vehicle connected to or integrated with a ground work device performing ground work, the aerial vehicle comprising:
   an airframe;
   an engine to generate power;
   a generator to generate electric power by using the power generated by the engine;
   a rotor to generate lift used for flight by rotating a propeller, the rotor comprising a main rotor driven by the power generated by the engine and a sub rotor driven by power generated by the generator or stored in a battery;
   a power transmission to transmit the power from the engine to the ground work device;
   a wheel; and
   support members having a predetermined elasticity and supporting the wheel on the airframe; wherein
   the ground work device is attached to the airframe and operated by the power from the engine transmitted by the power transmission;
   the ground work device is a tillage device; and
   the wheel contacts the ground when the tillage device performs work on the ground to support the airframe on the ground and assist the tillage device in working on the ground in a stable condition.

2. The aerial vehicle according to claim 1, wherein the power transmission is configured to transmit rotational power of the propeller as the driving power.

3. The aerial vehicle according to claim 1, wherein the ground work device is connected to the airframe of the aerial vehicle as a separate entity and is operated by the driving power transmitted from the power transmission.

4. The aerial vehicle according to claim 3, wherein the ground work device is detachable from the aerial vehicle.

5. The aerial vehicle according to claim 1, further comprising:
   a work controller configured or programmed to adjust the lift generated by the rotor to control at least one of ground work altitude of the ground work device and a depth of the ground work performed by the ground work device on a ground.

6. The aerial vehicle according to claim 5, wherein the work controller is configured or programmed to change a direction of the lift generated by the rotor to press the ground work device against the ground.

* * * * *